July 20, 1954   G. E. MATTOS   2,684,186
MATERIAL DISPENSER
Filed Oct. 30, 1950   4 Sheets-Sheet 2
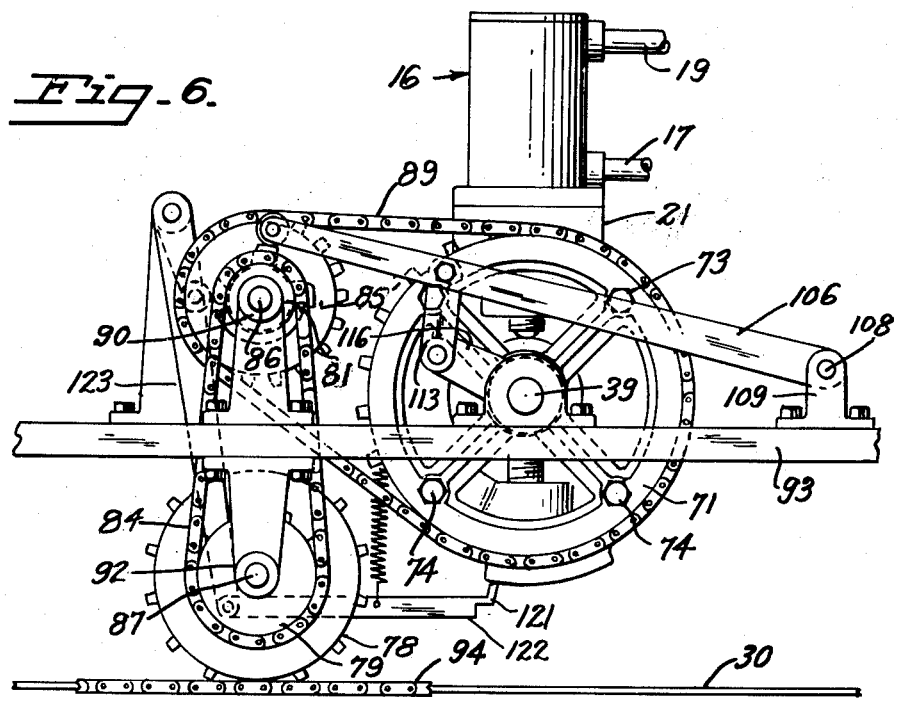
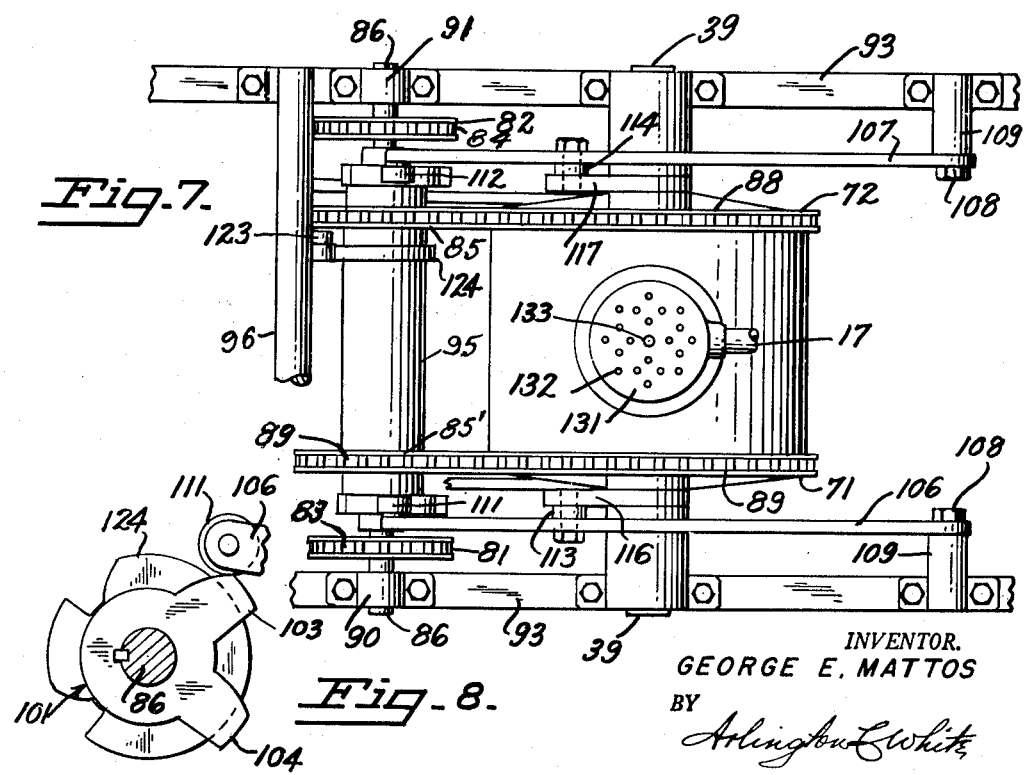
INVENTOR.
GEORGE E. MATTOS
BY
Arlington L. White
ATTORNEY July 20, 1954  G. E. MATTOS  2,684,186
MATERIAL DISPENSER
Filed Oct. 30, 1950  4 Sheets-Sheet 3
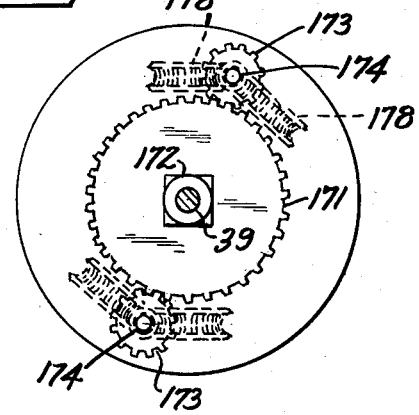
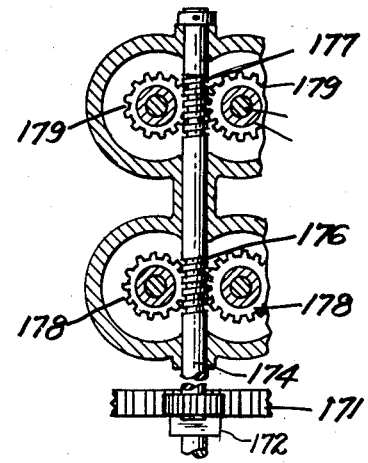
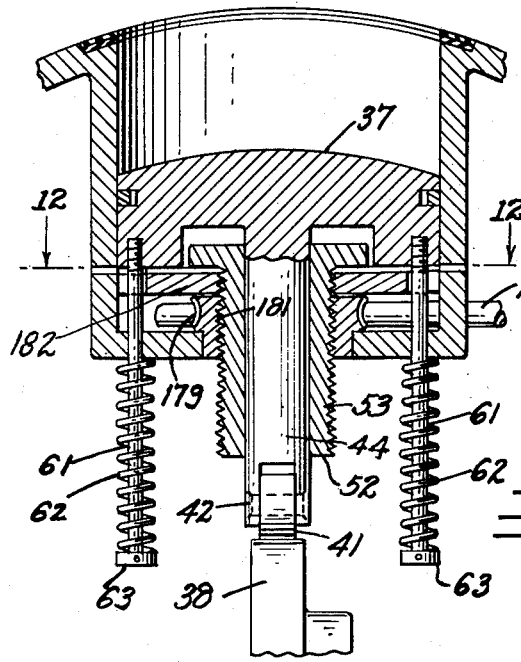
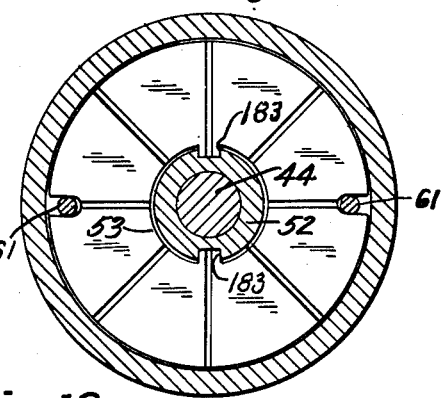
INVENTOR.
GEORGE E. MATTOS
BY
ATTORNEY July 20, 1954 G. E. MATTOS 2,684,186
MATERIAL DISPENSER
Filed Oct. 30, 1950 4 Sheets-Sheet 4

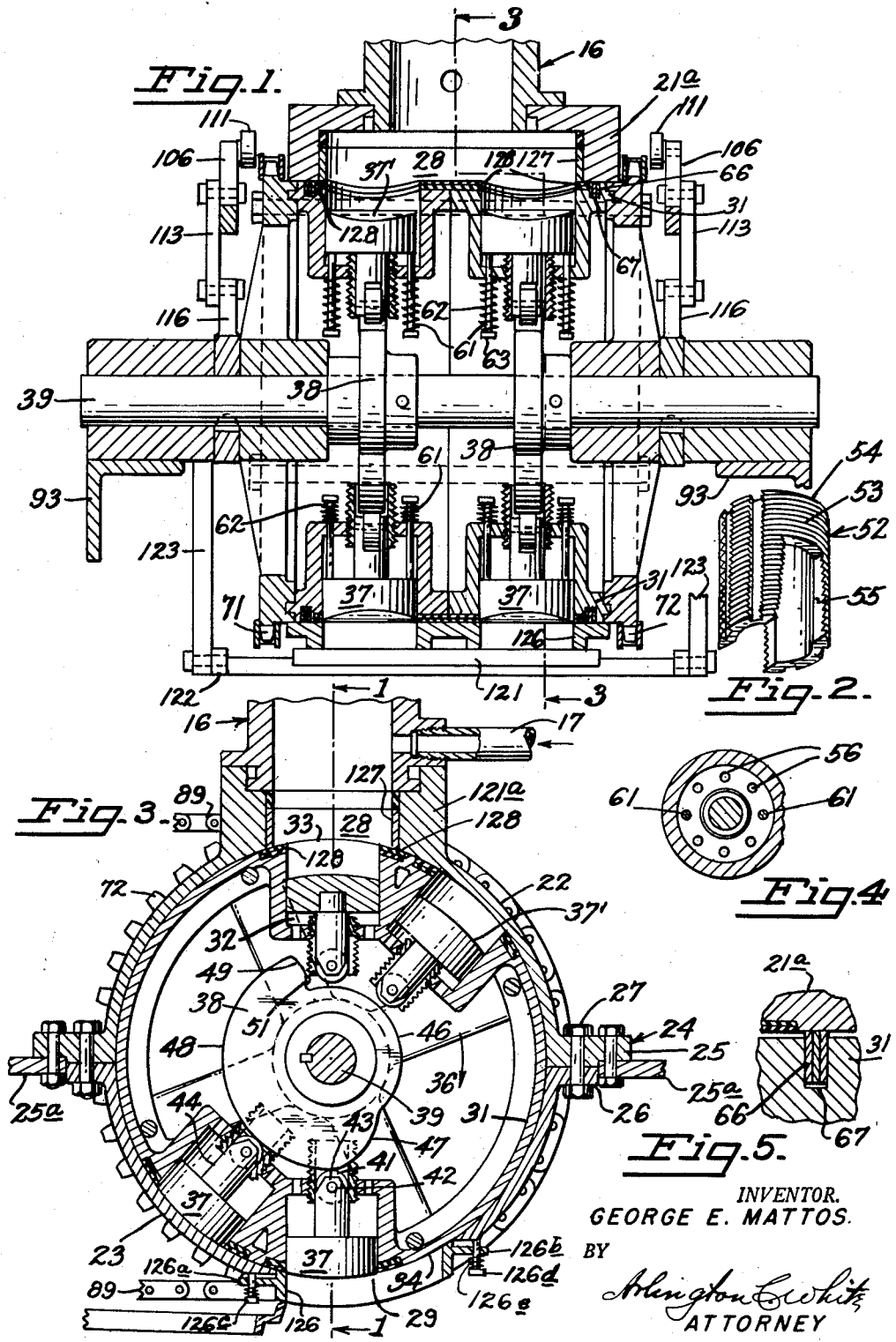

INVENTOR.
GEORGE E. MATTOS
BY
ATTORNEY

Patented July 20, 1954

2,684,186

UNITED STATES PATENT OFFICE 2,684,186

MATERIAL DISPENSER

George E. Mattos, Oakland, Calif., assignor of one-half to Jack Horner Pie Company, San Francisco, Calif., a corporation of California Application October 30, 1950, Serial No. 192,918

4 Claims. (Cl. 222—218)

The invention, in general, relates to devices for receiving a volume of material and dispensing such material in predetermined amounts at predetermined locations. More particularly, the invention relates to an automatic machine for receiving, handling and dispensing liquid, semi-solids, solids or other pourable or flowable material, including slurries of various forms, in measured predetermined amounts at any desired location in continuous, intermittent, periodic or recurrent deposits.

Heretofore, as is perhaps well known, considerable attention has been devoted to the provision of dispensing devices having for their primary object the reception therein of material in one form or state and the transfer therefrom of such material in a different form or state and in measured quantities. These prior devices, in the main, have been of relatively cumbersome and complex construction and, in addition to such disadvantages, lack essential features for affording the dispensing from the devices of uniform volumes or quantities of specified values at constant rates. Moreover, many of these prior devices include complex valve arrangements, with timing mechanisms or cams or eccentrics for operating the valves and controlling inlet and outlet ports for various material measuring units, all of which render the equipment relatively expensive to produce as well as to maintain. The present invention is directed to an improved material dispenser obviating substantially all inherent deleterious conditions of operations and disadvantages of prior machines.

A primary object of my invention is to provide an improved material dispenser which affords continuous delivery, handling and discharge of predetermined amounts of materials without likelihood of freezing of the equipment or overloading thereof.

Another important object of the present invention is to provide an improved material dispenser of the aforementioned character which is additionally characterized by the inclusion of positive acting vacuum break means to insure precise measured quantities of materials being delivered to the transfer mechanism of the unit.

A still further object of the invention is to provide an improved material dispenser of the aforementioned character which includes means for wiping excess material automatically from the discharge spout thereof to insure a sanitary end product and also to avoid binding of relatively movable parts.

Another important object of my invention is to provide a material dispenser of the indicated nature which is additionally characterized by the provision of means for adjusting the size or amount of the dispensed material while the equipment is operating whereby variable predetermined amounts of material can be dispensed from the equipment at will.

The foregoing and other objects are attained in a preferred embodiment of the invention which is illustrated in the accompanying drawings. It is to be understood, however, that I am not to be limited to the precise embodiment shown, nor to the precise arrangement of the various parts thereof, as my invention, as defined in the appended claims, can be embodied in a plurality and variety of forms.

Referring to the drawings:

Fig. 1 is a transverse, sectional, elevational view of a preferred embodiment of the present invention.

Fig. 2 is an enlarged perspective view of one of the adjusting sleeves employed in the preferred embodiment of the invention for regulating the volume or size of the deposits dispensed from the unit.

Fig. 3 is a transverse, horizontal sectional view of the preferred embodiment of the invention, this view also showing, in fragmentary view, a portion of the wiping pad or means operating at the discharge spout of the unit.

Fig. 4 is a cross-sectional view taken through one of the pockets of the rotary casing of the preferred embodiment of the invention.

Fig. 5 is a fragmentary detail illustrating the split ring seal between the main case and rotatable member of the preferred embodiment of the invention.

Fig. 6 is a fragmentary, side elevational view of the preferred embodiment of the invention with supporting frame omitted.

Fig. 7 is a fragmentary, top plan view of a preferred embodiment of the invention.

Fig. 8 is an enlarged detail of certain articulated cams employed in the preferred embodiment of the invention.

Fig. 9 is a fragmentary elevational view, partly in section, of a portion of the manual means of adjusting simultaneously a plurality of adjusting sleeves for regulating the volumes dispensed by the unit.

Fig. 10 is a longitudinal sectional view, in fragmentary illustration, of the adjusting means illustrated in Fig. 9 but also showing their driving connections with the adjusting sleeves.

Fig. 11 is a sectional, fragmentary elevational view of one of the pockets of the dispensing unit with adjusting sleeve and connections thereto for operating the same, as employed in the preferred embodiment of my invention.

Fig. 12 is a transverse sectional view taken on the line 12—12 of Fig. 11.

In its preferred form, the improved material dispenser of the present invention preferably comprises a split annular, stationary case having an inlet and an outlet, a movable member supported within said case; said member having a plurality of pockets therein arranged in juxtaposition and adapted periodically and recurrently to communicate with said inlet and with said outlet of said case, together with means for constantly feeding a volume of material to the inlet of said case, control means for moving predetermined amounts of said material through said inlet into said pockets successively and recurrently for discharge from said outlet, and adjustable means for varying the sizes of all of said pockets to vary the predetermined amounts of material handled by said pockets.

While the improved dispenser herein illustrated and described is entirely suitable for handling a wide variety of different materials whether in liquid, semi-solid, or solid state, such as slurries, creams, granular substances and the like, including the disposition or dispensing thereof into cans, jars, or other receptacles, the present embodiment of my invention has been especially devised for receiving and handling pie substances, such as mixes of fruit portions and fruit jellies, thick syrups, or the like, and depositing the same in precise predetermined quantities upon pie-shaped dough for ultimate inclusion in pies or upon dough for inclusion in pastries or in some instances directly into receptacles or jars. The invention, therefore, will be described in the specified environment of pie filling material but solely for purposes of example and explanation; it being understood that such environment is but one application of the invention.

Figure 13:
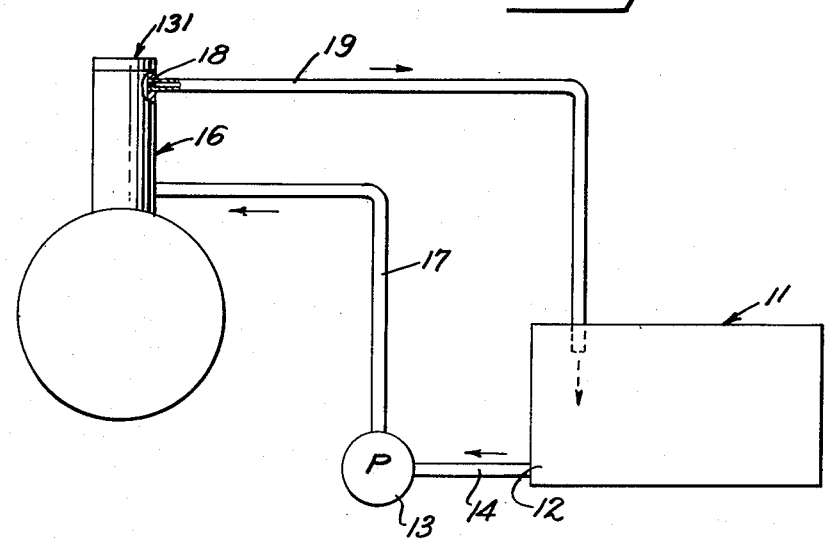
Fig. 13 is a diagrammatic view of the means for feeding materials to the dispenser.

With particular reference to Fig. 13 and to Figs. 1 to 5 inclusive of the annexed drawings, there are provided a suitable tank or receptacle 11 for holding a supply of the material which is ultimately to be dispensed in predetermined, precise amounts by my improved equipment as well as other elements associated with the tank 11. Since the present embodiment of the invention has been devised for handling foods, the tank 11 is preferably fabricated from, or its inner surface is lined with either "monel-metal" or stainless steel or other suitable chemically inert and rust-resisting material. The receptacle 11 may be provided with a removable lid, not shown, to facilitate replenishing the material contained therein and at the same time keeping deleterious substances away from the contents of the tank and avoiding contamination thereof, and it is provided with a main outlet 12 adjacent to the bottom thereof through which the material is withdrawn from the tank. Preferably, I employ a positive displacement pump 13 having its inlet in communication with the outlet 12 of container 11 through the medium of a conduit 14; the pump serving to deliver the material to a main feeding tube 16 for the dispenser through a conduit 17 which establishes communication between the outlet of pump 13 and the feeder tube 16. An overflow outlet 18 in tube 16 communicates with a return conduit 19, having a reduced inlet orifice for throttling effect on the flow, whereby overflow material from tube 16 is transmitted back to the tank 11; the small arrows in Fig. 13 of the drawings indicating the direction of flow of the material.

In accordance with my invention, I provide a stationary case 21, see Figs. 1 and 3, which preferably is fabricated from metal in two complementary half sections 22 and 23 each of which is a half ring or annulus and each of which is formed with side flanges 24 and 26 for receiving screw-bolts 27 whereby the two half sections can either be drawn tightly together to afford the outer case 21 or can be loosened for disassembly whenever it is desired to gain access to the interior of the case. One set of the flanges, such as the flanges 24, is provided or formed with an extended lip 25 in order that the case 21 can be supported laterally; the lip 25 resting upon a brace 25a which, in turn, is fastened to a lateral support, not shown. The half section 22 of case 21 is formed with a relatively large inlet 28 therein, and the annulus or half section 23 is formed with a relatively large outlet 29 therein; the latter constituting a discharge spout through which precise, predetermined amounts of material, such as pie-filling in the embodiment taken as an illustrative example of the invention, are dispensed and deposited onto dough, not shown, which is being carried in predetermined locations on a conveyer which continuously advances the pie or pastry dough portions successively beneath the outlet or discharge spout 29 of the case 21 during operation of the equipment.

As particularly illustrated in Figs. 1 and 3 of the accompanying drawings, the preferred embodiment of the present invention, includes a pocket containing member, designated generally by the reference numeral 31, which is movably mounted, preferably for rotary motion, within stationary case 21; the member 31 preferably being cast or otherwise fabricated from a metal which is chemically inert to food-stuffs, such as stainless steel, "monel-metal," and also which is rust-resisting. The member 31 is formed with a plurality of radially arranged pockets 32 therein having their inlets 33 lying flush with the periphery 34 of the member 31, as shown in Fig. 3. It is to be understood that any desired number of pockets 32 can be formed and arranged in any desired groupings in the rotatable member 31, depending upon the particular materials to be handled and the dispensing or discharging rate thereof in connection or association with other equipment. In this particular embodiment of the invention illustrated, I have provided eight pockets 32 in member 31 arranged in pairs for accomplishing the depositing onto dough material of precise amounts of pie filling at a predetermined rate in synchronism with the moving dough-carrying conveyer, hereinafter described. As indicated in Fig. 3, the pockets 32 of member 31 are in juxtaposition about the periphery 34 of the rotatable member 31 which, when driven in a clockwise direction as indicated by the arrow 36, will bring successive pockets 32 into registry first with the inlet 28 of case 21 and subsequently into registry with discharge spout or outlet 29 of the case continuously and recurrently during the operation of the equipment.

Each of the pockets 32 of rotatable member 31 contains a reciprocable, spring-loaded piston 37 which moves back and forth between two extreme positions within the pocket. Each piston 37 of each pocket 32 is urged to its outer extreme position by engaging cams, hereinafter explained, and maintained in such outer position for approximately one-half the distance of travel of each pocket on each revolution of member 31, and by virtue of being spring-loaded is brought and maintained in its innermost extreme position during the remainder of the distance of travel of the pocket in the circular path. It is also to be observed that I form the pistons 37 with a curved top 37' conforming to the curvature of the periphery 34 of rotatable member so that when the pistons 37 are at the top of their strokes, or outermost extreme positions, the meeting surfaces between piston tops 37' and periphery 34 of member 31 will be smooth, substantially continuous or flush thus avoiding crevices into which material may become lodged.

In order that each filled pocket 32 of member 31 will completely discharge its contents, with no likelihood of residue remaining in the pockets, on each revolution of rotatable member 31, I provide a specially formed cam 38 for engaging cam followers carried by the stems or rods of the pistons and for positively and rapidly moving the pistons from their innermost positions with the pockets full of material to their extreme outermost positions at the precise moment that the pockets register with discharge spout or outlet 29 of the case 21. Cam 38 is clearly illustrated in Fig. 3 of the drawings and such cam is keyed or otherwise fixedly secured upon the shaft 39 about which the member 31 rotates; the shaft 39 together with cam 38 being arranged for restricted oscillatory movement as hereinafter described. The shape of cam 38 is critical inasmuch as this cam is engaged, during operation of the equipment, by cam followers or rollers 41 mounted by means of pins 42 retained in a bracket portion 43 of the piston rods or stems 44 of each piston 37. The critical shaping of cam 38 controls the strokes of the pistons 37 through the cam followers 41, and it is to be observed that I provide on cam 38 a uniform arcuate portion 46 of short radius extending in one section of the cam and merging at one end thereof into a projecting portion 47 leading, in turn, to one terminus of a uniform arcuate portion 48 of greater radius than arcuate portion 46. The cam 38 also includes an abruptly converging portion 49 leading from the other terminus of arcuate portion 48 to a straight portion 51 which, in turn, merges with the other end of the arcuate portion 46. During the course of travel of pockets 32 about the arcuate portion 46 of cam 38, as the rotatable member 31 revolves about shaft 39, the cam followers 41 of the piston rods 44 are not in engageemnt with cam 38 and the spring-controlled pistons 37 are in their innermost positions within their pockets 32. However, just prior to reaching the discharge outlet 29 of outer case 21, the cam following rollers 41 engage the projecting portion 47 of cam 38 and ride thereon to move each piston 37 towards its outermost positions. By the articulated cam arrangement, hereinafter described, the cam 38 oscillates toward and away from the outlet 29 but the timed relationship between the oscillation of cam 38 and the movement of member 31 is such that at the moment that the individual pockets 32 become aligned with the outlet 29 of case 21, the projecting portion 47 of cam 38 urges the piston 37 of each pocket to its full outward stroke thereby effecting the complete discharge of each pocket on each full revolution of member 31. This movement of the pistons 37 from their innermost to their outermost positions is relatively fast and governed by the articulated cam arrangement, the action of the cams avoiding undue thrust of the pistons and affording smooth action throughout with no likelihood of stresses or strains on the pistons.

It is to be further observed that on each revolution of rotatable member 31, after each pocket 32 is carried past the discharge outlet 29 of case 21, the cam followers 41 of piston rods 44 continue to engage the cam 38 and ride upon the arcuate portion 48 thereof thus holding the pistons 37 at their outer extreme positions until just before each pocket reaches a position in registry with the inlet 28 of case 21. At this point in its path of travel, each cam following roller 41 on each piston rod 44 rather abruptly disengages from arcuate portion 48 and rides off the cam 38 at the terminus of converging portion 49 thereof, or at the juncture of converging portion 49 with straight portion 51 of cam 38. Thereafter, cam following rollers 41 remain free of the cam 38 until just prior to reaching the discharge outlet 29 of the case 21 and the foregoing cycle is repeated.

As will appear from an inspection of Figs. 1, 2 and 3 of the annexed drawings, the piston rods 44 of pistons 37 in pockets 32 are slidable in an adjustable bushing or sleeve 52 which carries external threads 53 for threaded engagement with either a threaded opening in the bottom of each pocket 32 in one embodiment of the invention wherein the bushings or sleeves 52 are adjustable manually or for threaded engagement with a worm, hereinafter described, in an embodiment of the invention wherein the sleeves 52 are all adjusted simultaneously. The bushings 52 are open at each end to permit passage of piston rods 44 and cam followers 41 thereon. When the pistons 37 of pockets 32 are in their inner extreme positions, the bottoms of the pistons rest upon the inner ends 54 of the sleeves 52. With reference to Fig. 3 of the drawings, I have shown the piston 37 of pocket 32 which is in registry with inlet 28 of case 21 and in a position slightly above the end 54 of the sleeve 52 associated with such piston to indicate that material has not been fed into the pocket; while the piston 37 of the leading pocket 32, in clockwise direction, is shown seated on the inner end 54 of its sleeve 52 to indicate that such leading pocket 32 is filled with material. It is apparent that by turning up the threads 53 of bushings 52, the capacity of each pocket 32 may be varied at will, as desired, for volume or weight whichever is the basis for loading, since the disposition of each piston 37 in each pocket is controlled, insofar as its inner extreme position is concerned, by the extent to which bushings or sleeves 52 are disposed within the pockets 32. It is to be especially observed, as illustrated in Fig. 2 of the drawings, that the bushings 52 are formed with diametrically opposed slots 55 therein to permit clearance of cam 38 on its oscillatory movement in relation to the rotary movement of member 31.

While the sleeves 52 may be adjusted by hand to regulate the capacities of pockets 32, by reaching within casing 31 and turning the sleeves the desired number of turns, I have provided alternative means, illustrated in Figs. 9 to 12 inclusive of the drawings, for automatically adjusting and setting all of the sleeves 52 simultaneously from a point externally of case 21, thus simultaneously adjusting the displacement of pistons 37 or regulating their strokes and, of course, controlling the capacities of the pockets 32. It may be added here, as illustrated in Fig. 4 of the drawings, that I preferably form the bottoms of pockets 32 with a series of small vent holes 56 therein to prevent air from being trapped when the pistons 37 are released on their filling strokes and allowed to descend. While the impact of the bottom of each piston 37 with the inner end 54 of each adjustable bushing 52 is cushioned by created vacuum on each loading of the pockets 32, each piston 37 preferably is spring-loaded to assist the intake of material at inlet 28 by means of a plurality of pins 61 which are screwed into the inner end or bottom of each piston and which depend therefrom and extend through some of the holes 56 in the bottom of each pocket 32 and also by means of springs 62 coiled around each rod 61; one end of each spring 62 abutting the bottom of the pocket 32 in the other end thereof abutting a nut 63 on the outer end of each rod 61. By virtue of these springs 62, on the out stroke or ascent of each piston 37 the compression of the springs 62 regulate the speed of discharge of the contents of the pockets 32. It also is to be observed that the pins 61 serve to hold the pistons 37 against rotating in their pockets 32.

The outer ends or tops 37' of the pistons 37 are preferably rounded, as clearly shown in Fig. 3 of the annexed drawings, to correspond to the curvature of the inside periphery or circumference of the rotatable member 31 and thereby reduce friction and wear of parts. In order to effect a seal between the outer case 21 and the rotatable member 31 and thus avoid undue leakages or seepages of materials therebetween which otherwise would freeze the relatively movable parts, I preferably insert a series of split rings 66 in grooves 67 extending circumferentially about the periphery of member 31; such rings 66 being of resilient material and being sprung into position when the complementary halves of outer case 21 are tightened together about the rotatable member 31 by turning up the nuts of screw-bolts 27 at the sides of the case 21.

In Fig. 6 of the annexed drawings, I have illustrated the drive means for the improved material dispenser of the present invention, such means preferably including a pair of drive-sprockets 71 and 72 having the dual function of actuating rotatable elements of the unit, as hereinafter explained, and also of constituting flanges and side-walls which, together with clamp-bolts 73 and 74, arranged in right and left hand pairs, respectively, serve as a frame-work bounding the rotatable member 31. The assembly or rotatable member 31 with bounding side-wall consisting of the drive-sprockets 71 and 72, forms a complete drum and is centrally bored for passing the shaft 39 on which cam 38 is secured and for permitting the entire drum, as aforesaid, to revolve freely of the case 21 and shaft 39. While not shown in Figs. 6 and 7, the entire dispensing unit is laterally and longitudinally supported by a suitable frame work.

Since the embodiment shown has been specially constructed for the dispensing of pie filling onto pie-shaped dough carried at spaced intervals on a link-belt conveyer, designated generally by the reference numeral 30, the movement of the member 31 is synchronized to the movement of conveyer 30. To this end, I preferably employ a series of sprockets and chains for the driving connections between the link-belt conveyer 30 and the driven sprockets 71 and 72 of the rotatable member 31 and these driving connections include a pair of relatively large sprocket-wheels 78, of which but one is shown, on opposite sides of my improved unit which are mounted in alignment with and in meshing engagement with the side chain links 94, of which but one is shown, of the link-belt conveyer 30. Secured to the sprocket-wheels 78 and rotatable therewith are bottom sprockets 79, of which but one is shown, and I mount above such bottom sprockets in alignment therewith a top pair of sprockets 81 and 82 which are driven from the relatively large sprockets 78 by means of chains 83 and 84, respectively, trained around the top and bottom sprockets of each aligned pair of sprockets 79, 81 and 79, 82 at the opposite sides of the unit. Sprockets 81 and 82 are mounted on a transverse shaft 86 journaled in brackets 90 and 91 which are secured, respectively, to opposite sides of auxiliary frame 93 while the bottom sprockets 79 as well as the relatively large sprocket-wheel 78 are mounted on a transverse shaft 87 journaled in depending brackets 92 secured to the auxiliary frame 93 on opposite sides thereof.

In addition to the foregoing series of sprockets and chains, I mount in spaced relationship on the exterior of a tube or cam shaft 95 a pair of sprockets 85 and 85' which are arranged in alignment, respectively, with the driven sprockets 71 and 72 of the rotatable member 31, and I train chains 88 and 89 around the pairs of aligned sprockets 71, 85 and 72, 85' to complete the driving connection between link-chains 94 of the conveyer 30 and the rotatable member 31. The tube or cam shaft 95 is removably coupled by means of a clutch, not shown, to the transverse shaft 86, and suitable linkage, a part of which is shown at 96 in Fig. 7 of the drawings, is provided for manually engaging and disengaging the clutch. It is, of course, to be understood that transverse shafts 86 and 87 can be connected to the shafts of motors, rather than be driven from the link-chains 94 of the conveyer 30, so that my improved material dispenser can be employed in other industrial applications than to the use or purpose hereinabove specified for the embodiment illustrated.

In accordance with the present invention, I have also provided in the present embodiment of my invention which embraces the rotatable member 31 containing pockets 32 which are radially arranged in spaced juxtaposed pairs as depicted in Fig. 1 of the drawings, sets of articulated cams whereby periodic and recurrent oscillation of cam 38 through a short oscillatory range is effected in timed relationship with the movement of the pairs of pockets 32 as well as the movement of conveyer 30 so that full discharge of the pockets 32 is had through outlet 29 of case 21 recurrently. To this end, I provide on the tube or cam shaft 95, for rotation therewith, a pair of two-lobe cams 101 and 102 having their lobes 103 and 104 arranged thereon in predetermined spaced relationship as illustrated in Fig. 8 of the drawings, together with suitable linkage connecting the cams 101 and 102 to the shaft 39 on which cam 38 is mounted.

As particularly shown in Figs. 7 and 8 of the annexed drawings, the linkage just alluded to consists of a pair of relatively long links 106 and 107 mounted at opposite sides of the unit for pivotal movement through the medium of pivot pins 108 on bracket 109, the latter projecting from auxiliary frame 93. The free extremities of links 106 and 107 carry rollers 111 and 112, respectively, which engage cams 101 and 102 and follow the paths of lobes 103 and 104 thereof, whereby the links 106 and 107 are raised and lowered periodically and recurrently by the action of cam lobes 103 and 104 striking the cam followers 111 and 112. In addition, I provide a pair of connecting links 113 and 114 which join the links 106 and 107, respectively, to arms 116 and 117, respectively, connected to and extending from the shaft 39 of the drum assembly to which the cam 38 is keyed. The articulation thus effected causes oscillation of cam 38 within a short range of oscillation in timed relationship with the movement of pockets 32 of rotatable member 31 so that the cam followers on pistons 37 in pockets 32 will engage the portion 48 of cam 38 at the effective moments to move pistons 37 to their outer extreme positions when the pockets 32 are in registry with outlet 29 of case 21, or in the positions indicated at the bottoms of Figs. 1 and 3 of the annexed drawings.

In order to avoid undue seepage of material onto the periphery of rotatable member 31 at the discharge spout or outlet 29 of case 21 during operation of the dispenser, I also provide a wiper element 121, see Figs. 3 and 6 of the drawings, which is secured to the free extremity of a link 122 pivotally connected to a link 123 which, in turn, is connected to and moved by rotatable movement of a wiper pad timing cam 124 of the configuration shown in Fig. 8 of the drawings for embodiments of my dispenser illustrated herein. Timing cam 124 is keyed or otherwise secured to cam shaft 95 and rotates therewith to periodically and recurrently operate linkage 122 and 123 thereby to effect rapid, intermittent wiping of the drum surface by the wiper pad 121 at the discharge spout 24 of case 21 thereby avoiding seepage of material from the lip of the outer case inwardly to the periphery of rotatable element or member 31.

As additional leakage or seepage inhibiting means, I provide at the discharge spout 29 of case 21 a floating seal 126 for preventing leakage or seepage of material from the mouth 33 of each pocket 32 into the space between the periphery of the member 31 and the inner wall of case 21 thus augmenting the action of the wiper pad 121 and obviating the freezing of relatively moving parts of the unit. Seal 126 preferably consists of a metal member with a rubber gland 125 thereon and is floatably supported in operative position by providing lateral extensions 126a and 126b on the metal member of the seal which project through grooves formed in the case 21, together with bolts 126c and 126d which pierce the lateral extensions 126a and 126b, respectively, and extend into the case 21; each bolt having a spring 126e coiled about the same and confined between the lateral extensions 126a and 126b at one end thereof and the nuts 126d of the bolts. Moreover, I provide a floating seal 127 at the inlet 28 of case 21 to prevent leakage or seepage of material at such inlet and thus reduce the likelihood of freezing of moving parts, such seal 127 being confined between the periphery 34 of the rotatable member 31 and a depending annular flange 21a of the case 21.

To the end that seepage of pie-filling material does not occur adjacent to the mouth 33 of each pocket 32 and carry over in between the outer case 21 and the rotatable member 31, I preferably form a recess in the periphery 34 of the rotatable member 31 adjacent to the mouth 33 of each of the pockets 32 and insert in each of these recesses a rubber seal 128 as clearly depicted in Fig. 3 of the annexed drawings. Thus, as material is fed from the inlet tube 16 through the inlet 28 of the case 21 into each pocket 32 as it is carried about by the rotatable member 31 any excess of material fed to each pocket cannot pass in between the outer case 21 and the rotatable member 31 by virtue of these rubber seals 128 disposed about each of the pockets 32 and, as a result, there is no likelihood of any freezing or binding of the relatively moving parts of the unit.

Figure 14:
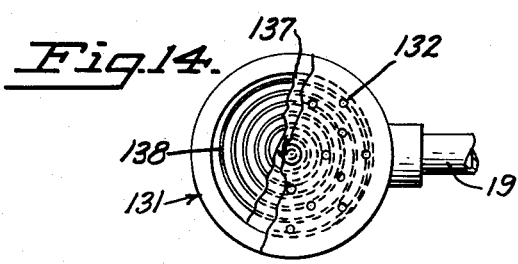
Fig. 14 is a fragmentary plan view of the feeder tube of the preferred embodiment of the invention, partly broken away to illustrate the vacuum break assembly therein.
Figure 15:
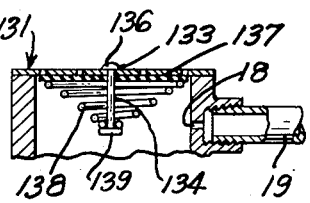
Fig. 15 is a fragmentary, elevational view of the feeder tube illustrating the closed position of the vacuum break employed in the preferred embodiment of the invention.
Figure 16:
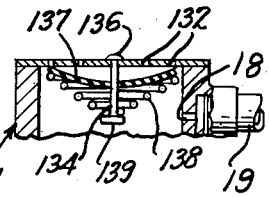
Fig. 16 is a view similar to Fig. 15 but illustrating the open position of the vacuum break.

In accordance with my invention, and in order that precise predetermined amounts, by volume or by weight, be delivered from feeder tube 16 to each of the pockets 32 of rotatable member 31 when the pump 13 and the remainder of the equipment is in operation, I provide a vacuum break element in the feeder tube 16 which automatically operates to relieve the vacuum or pressure changes created upon each discharge or delivery of material from the feeder tube into pockets 32 of the rotatable element 31. In view of the fact that the pump 13 is constantly delivering material under pressure from tank 11 to the tube 16 for subsequent delivery to the pockets 32 of rotatable member 31, and because this delivery of each charge of material from tube 16 to each pocket 32 is under pressure, it is apparent that upon each transfer of a charge of material from feeder tube 16 to a pocket 32 there is set up a potential vacuum or pressure change within tube 16 because of the air space above the point of entrance of material into tube 16 and above the point of exit or egress of material through by-pass or return conduit 19; which potential vacuum or pressure change, unless relieved, would add a suction pressure upon the charge of material being delivered under pressure from pump 13 and, as a result, underload the pockets 32 of the rotatable member 31 and have a tendency to cause air to be included in the charge. To avoid such deleterious conditions and to effect the proper density of the load and therefore avoid non-uniform deposits of material ultimately onto the conveyor 30, I provide within feeder tube 16 or as a part thereof, automatically acting valve means to effect the admission of air into feeder tube 16 to replace the material removed by the created displacement or pressure change. To this end, I provide a perforated closure or top 131 for the feeder tube 16; the perforations being in any desired number and being designated in Fig. 14 of the accompanying drawings by the reference numeral 132; the closure 131 being formed with a central opening 133 therein for passage of a bolt or retainer element 134 extending within the tube 16 and held in operative position by means of an outer flange or nut 136 thereon, as clearly indicated in Figs. 15 and 16 of the annexed drawings. In addition, my vacuum break elements include a rubber diaphragm 137 of relatively thin section which is supported by a cone-shaped spring 138 confined between the diaphragm 137 and a nut 139 of the bolt 134, see Figs. 15 and 16. The diaphragm 137 normally is retained against the underside of the closure 131 of feeder tube 16 but when the equipment is placed in operation, the diaphragm 137 becomes distorted or bulges as indicated by the showing in Fig. 16 of the drawings and thereby pulling its rim away from the inner wall of the tube and creating an annular space between such diaphragm 137 and the inner wall of the tube 16 for permitting ingress of air from the atmosphere through the perforations 132 of closure 131 into the interior of the feeder tube 16. This distortion of diaphragm 137 occurs intermittently upon each transfer of material from the feeder tube 16 to a pocket 32 of the rotatable element 31 and the diaphragm 137 intermittently and recurrently assumes its flat or normal position, as indicated in Fig. 15, between the successive transfers of the charge of material from feeder tube 16 to pockets 32 of the element 31. Thus, the diaphragm 137 is in substantially constant motion from its normal position to its distorted position and back again all during the operation of the machine and consequently acts as a vacuum break during the entire operation of the machine and by such action controls and regulates the amounts of the charges of materials precisely that are transferred periodically and recurrently from the feeder tube 16 into the pockets 32 of member 31.

While I have above indicated that it is possible to make individual adjustments of the bushings or sleeves 52 to vary the sizes of pockets 32, merely by rotating such bushings to the desired extent, I have illustrated in Figs. 13 to 16 inclusive an arrangement of cooperating parts for automatically adjusting all of the bushings 52 simultaneously thereby to increase or decrease the sizes of all pockets 32 simultaneously; such automatic adjusting means being actuatable externally of the case 21.

In Figs. 9 to 12 inclusive of the annexed drawings, I have illustrated a modified arrangement of adjusting means for regulating the capacities of the pockets 32 of rotatable member 31. With reference to Figs. 9 and 10 of the accompanying drawings, it will be observed that I provide a relatively large gear-wheel 171 which is disposed internally of the case 21 and readily accessible to an operator for turning on the shaft 39. A convenient means for effecting the rotation or turning of gear-wheel 171 is to form a socket in the outer end of the hub 172 of shaft 39 for the application of a conventional speed-wrench in the hands of an operator thereby enabling the manual turning of shaft 39 and its mounted gear-wheel 171. There are also provided in this arrangement a pair of relatively small gears 173, see particularly Fig. 9 of the drawings, which are supported in meshing engagement with the large gear-wheel 171 and which are keyed or otherwise secured to shafts 174. The shaft of each gear 173 is formed with spaced threads 176 and 177 thereon which engage worm-gears 178 and 179 in pairs, see Fig. 10 of the drawings; the worm-gears 178 and 179 being internally threaded, as indicated at 181 in Fig. 11 of the drawings, for turning the bushings or sleeves 52 all at the same time. That is to say, the location of the threads 176 and 177 on the shafts 174 of the small gears 173 is critical in that they are arranged for the meshing engagement therebetween and the worm-gears 178 and 179 which effect the turning of all sleeves or bushings 52 by virtue of the internal threading of the worm-gears for meshing with the threads 53 of each sleeve 52. Thus, upon rotatable movement of the gear-wheel 171, utilizing a speed-wrench, all of the sleeves 52 are simultaneously either raised or lowered within pockets 32 of rotatable member 31 through the medium of the aforesaid small gears 173, the threaded shafts 174 of such gears and the worms 178 and 179 which mesh with the threads 53 of the bushings. In order that the bushings 52 be maintained in their adjusted or set positions, I provide a cover plate 182, see Figs. 11 and 12 of the drawings, within each pocket 32, which are disposed between the top of the worms 178 or 179 as the case may be as shown in Fig. 11, and the bottoms of the pistons 37; each cover plate 182 being apertured for passage of the screws or rods 61 and each cover plate being keyed, as at 183, see Fig. 12 to lock the sleeves 52 against rotation. Since the present embodiment of my invention includes eight pockets 32 arranged in pairs, in juxtaposition, it is only necessary to provide two gears 172 in spaced meshing engagement with the gear-wheel 171 for turning the worms 178 and 179 associated with each gear 172, and thus effect simultaneously raising and lowering of the threaded bushings 52 in the pockets 32 of rotatable member 31. By this action, the range of movement of the pistons 37 within pockets 32 is controlled and hence the capacities of the pockets are readily regulated simultaneously in one operation.

It is to be understood that the appended claims are to be accorded a range of equivalents commensurate in scope with the advance made over the prior art.

I claim:

1. A material dispenser comprising a stationary case having an inlet and an outlet, a member rotatably mounted in said case; said member having a plurality of radially arranged juxtaposed pockets therein, means for continuously rotating said member to bring said juxtaposed pockets successively and recurrently into registry with said inlet and said outlet, a feeder tube in communication with said inlet, means for feeding material continuously and by uninterrupted flow under pressure through said feeder tube and through said inlet, means for continuously rotating said member to bring said pockets successively and recurrently into registry with said inlet and said outlet, a valve in said feeder tube for controlling air admission into said tube to regulate the pressure differential therein upon the transfer of material from said tube to each of said pockets, a piston movably mounted in each of said pockets, and means for actuating said pistons in timed relationship to the rate of rotation of said member for moving each of said pistons to the full extent of its stroke when each of said pockets are in registry with said outlet.

2. A material dispenser comprising, in combination with a moving conveyer, a stationary case having an inlet and an outlet, a member rotatably mounted within said case; said member having a plurality of juxtaposed radially arranged pockets therein, means placing said member in driving connection with said conveyer whereby said member is rotated continuously in synchronism with the moving conveyer; rotation of said member bringing said pockets recurrently and successively into registry with said inlet and said outlet, a piston movably mounted in each of said pockets, means for moving said pistons in synchronism with the moving conveyer to dispose said pistons at their inner-most positions in said pockets when said pockets are in registry with said inlet and to dispose said pistons at their outer-most positions when said pockets are in registry with said outlet, a feeder tube in communication with said inlet, means for feeding material under pressure continuously and by uninterrupted flow to and through said feeder tube to said pockets, and means in said feeder tube for regulating the pressure therein to effect transfer of constant charges of material from said tube into said pockets.

3. The combination defined in claim 2, and including means for simultaneously varying the capacities of all of said pockets.

4. In a material dispenser including a rotatable member having a plurality of pockets therein, a piston movably mounted in each of said pockets, a sleeve movably mounted in each of said pockets below said pistons, and gearing associated with said sleeves for moving the same externally of said rotatable member to regulate the capacities of said pockets simultaneously.

References Cited in the file of this patent

UNITED STATES PATENTS

| Number | Name | Date |
|---|---|---|
| 709,793 | McGinnity | Sept. 23, 1902 |
| 961,741 | Workman | June 14, 1910 |
| 1,365,773 | Dickerson | Jan. 18, 1921 |
| 1,676,377 | Bergmann | July 10, 1928 |
| 1,760,404 | Funk | May 27, 1930 |
| 1,809,813 | Kantor | June 9, 1931 |
| 2,043,578 | De Markus | June 9, 1936 |
| 2,067,968 | Kohler | Jan. 19, 1937 |
| 2,097,887 | Lacey | Nov. 2, 1937 |
| 2,158,910 | Pellar | May 16, 1939 |
| 2,495,671 | Cellwork | Jan. 24, 1950 |
| 2,547,516 | Zeun | Apr. 3, 1951 |

FOREIGN PATENTS

| Number | Country | Date |
|---|---|---|
| 337,622 | Germany | June 3, 1921 |